United States Patent [19]

Beeson et al.

[11] Patent Number: 4,864,881
[45] Date of Patent: Sep. 12, 1989

[54] POWERSHIFT TRANSMISSION WITH FOUR SPEED RANGES IN FORWARD AND REVERSE

[75] Inventors: John M. Beeson; John P. McAskill; James D. Burnham, all of Coffeyville, Kans.

[73] Assignee: Cooper Industries, Inc., Houston, Tex.

[21] Appl. No.: 208,863

[22] Filed: Jun. 15, 1988

Related U.S. Application Data

[63] Continuation of Ser. No. 20,218, Mar. 9, 1987, abandoned, which is a continuation of Ser. No. 751,761, Jul. 1, 1985, abandoned.

[51] Int. Cl.$^4$ .................. F16H 3/08; F16H 57/04; F16H 57/02
[52] U.S. Cl. .................................. 74/360; 74/331; 74/467; 74/606 R
[58] Field of Search ................ 74/360, 364, 330, 331, 74/606 R, 467

[56] References Cited

U.S. PATENT DOCUMENTS

| | | | |
|---|---|---|---|
| 3,102,432 | 9/1963 | Gerst | 74/360 |
| 3,273,415 | 9/1966 | Frost | 74/360 |
| 3,350,951 | 11/1967 | Frost et al. | 74/360 |
| 3,361,001 | 1/1968 | Stuart | 74/364 |
| 3,425,293 | 2/1969 | Krawczyk et al. | 74/360 |
| 3,465,609 | 9/1969 | Fisher et al. | 74/360 |
| 3,782,214 | 1/1974 | Chivori | 74/331 |
| 3,858,455 | 1/1975 | Sisson et al. | 74/360 |
| 3,893,345 | 7/1975 | Sisson et al. | 74/360 X |
| 3,913,411 | 10/1925 | Jameson | 74/360 |
| 3,916,714 | 11/1975 | Sisson et al. | 74/360 X |
| 4,252,031 | 2/1981 | Nishimura et al. | 74/360 |
| 4,392,391 | 7/1983 | Jameson et al. | 74/360 X |
| 4,549,443 | 10/1985 | White | 74/360 |
| 4,570,503 | 2/1986 | Theobald | 74/360 |
| 4,771,647 | 9/1988 | Stevens | 74/360 |

FOREIGN PATENT DOCUMENTS

| | | | |
|---|---|---|---|
| 1102570 | 3/1961 | Fed. Rep. of Germany | 74/360 |
| 1587699 | 4/1981 | United Kingdom | 74/360 |

Primary Examiner—Leslie A. Braun
Assistant Examiner—Harold F. Macris
Attorney, Agent, or Firm—David A. Rose

[57] ABSTRACT

A multi-speed power shift gear transmission includes an input shaft, an output shaft and two clutch shafts arranged substantially parallel to each other. Each of the clutch shafts includes a directional clutch and two speed range clutches whereby a total of four speeds in each direction of rotation of the output shaft may be obtained. The clutch shafts are arranged to support the directional clutches at adjacent ends whereby the directional clutches may be accessed for service and repair by removal of a separate cover member and without removing any of the other clutches or gears from the clutch shafts. The opposite ends of the clutch shafts are adapted to support and locate a control valve housing for close communication of the clutch actuating fluid control valves and the transmission cooling and lubricant fluid flow paths.

6 Claims, 3 Drawing Sheets

|   | FWD | REV |
|---|---|---|
| 1 | 50+62 | 94+62 |
| 2 | 50+106 | 94+106 |
| 3 | 50+64 | 94+64 |
| 4 | 50+108 | 94+108 |

POWERSHIFT TRANSMISSION WITH FOUR SPEED RANGES IN FORWARD AND REVERSE

RELATED APPLICATION

This is a continuation application of application Ser. No. 07/020,218, filed on Mar. 9, 1987, now abandoned, which is a continuation application of application Ser. No. 06/751,761, filed July 1, 1985, now abandoned.

BACKGROUND OF THE INVENTION

1. Field of the Invention

The present invention pertains to multi-speed hydraulically actuated powershift type gear transmission having four speeds in forward and reverse and an improved arrangement of directional clutches and hydraulic control valves.

2. Background

In the art of multi-speed powershift type gear transmissions there are several problems which confront the art worker in any effort to design a transmission having a particular number of speed ranges of the output shaft relative to the input shaft in both forward and reverse direction. In certain vehicle applications it is highly desirable to provide a transmission having as many as four output shaft speeds in both forward and reverse direction of shaft rotation. In order to provide a cost effective, easily manufacturable and easily serviceable transmission the art worker is then confronted with the problem of selection of the number of and arrangement of the directional and speed range clutches as well as the number of gears required to achieve the requisite speed ranges in both forward and reverse.

Another problem in the art of powershift transmissions pertains to the accessibility of the directional clutches, in particular. In many applications of powershift transmissions the directional clutches are subject to particularly heavy use and rapid wear and are desirably easily accessible for servicing and repair without disassembly of the transmission itself.

Still further problems associated with powershift transmission design pertain to the location of the hydraulic control valving for the directional and speed range clutches in order to minimize flow losses and improve clutch engagement and disengagement response time.

The abovementioned desiderata and problems related to the art of powershift gear transmissions have been satisfied and overcome, respectively, by a multi-speed powershift transmission in accordance with the present invention.

SUMMARY OF THE INVENTION

The present invention provides an improved multi-speed gear transmission comprising a plurality of hydraulically actuated clutches, gears and shafts arranged in an improved and compact configuration which minimizes the number of gears and clutches while providing for as many as four speed ranges in forward and reverse as regards the transmission output shaft with respect to the transmission input shaft.

In accordance with an important aspect of the present invention a multi-speed hydraulically actuated clutch powershift type transmission is provided wherein two clutch shafts are required and include three clutches for each shaft. An improved arrangement and minimum number of gears are also provided on the two clutch shafts and are drivably connected to an output shaft. In particular, a powershift transmission having four speeds forward and four reverse is advantageously arranged to have a total of six clutches, thirteen gears and five shafts including an idler shaft in the input gear train.

In accordance with another important aspect of the present invention there is provided an arrangement of a hydraulically actuated clutch type powershift transmission wherein the clutch shafts extend through one end of the transmission housing and serve as means for piloting a control valve housing wherein passageways interconnecting the various clutches with a hydraulic control circuit are of minimal length and the valve housing is easily accessible for removal for servicing and repair of fluid seals between the rotating shafts and the valve housing.

In accordance with still a further aspect of the present invention the transmission forward and reverse directional clutches are arranged on the respective clutch shafts in such a way that they are accessible from the exterior of the transmission housing by the removal of a single cover member whereby the clutches may be inspected, serviced or repaired without requiring disassembly of the transmission or, in many applications, removal of the transmission from its working environment.

The abovementioned features and advantages of the present invention together with other superior aspects thereof will be appreciated by those skilled in the art upon reading the detailed description which follows in conjunction with the drawing.

DESCRIPTION OF THE PREFERRED EMBODIMENT

In the description which follows like parts are marked throughout the specification and drawing with the same reference numerals, respectively. The drawing figures are not necessarily to scale and conventional components shown in the drawing figures are not necessarily described in detail in the specification as their function and configuration will be readily apparent to those skilled in the art.

Figure 1:
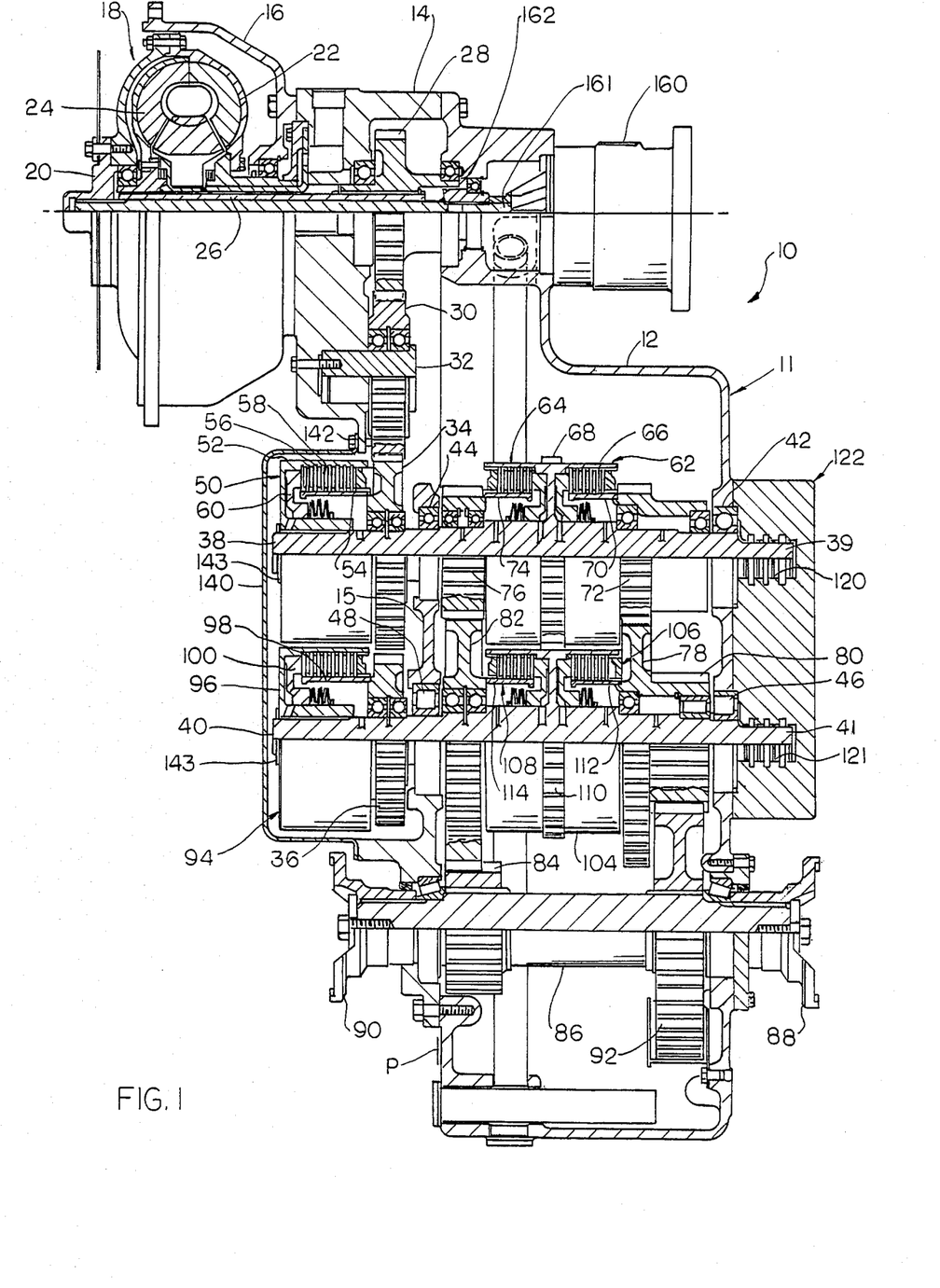
FIG. 1 is a developed section view taken along line 1—1 of FIG. 2 of the improved powershift transmission of the present invention.

Referring to FIG. 1 there is illustrated a multi-speed hydraulically controlled powershift transmission, generally designated by the numeral 10, which is of a type which is advantageously utilized in various land vehicle applications. For example, the transmission 10 may typically be used as the main propulsion system transmission for an off road vehicle such as bulk material loader, material handling lift truck and similar vehicles which require a wide range of operating speeds in both forward and reverse propulsion modes.

The transmission 10 is preferably provided with a two-part cast metal housing 11 having opposed housing sections 12 and 14 and a bell housing 16 for enclosing a conventional torque converter 18. The housing sections 12 and 14 are engaged with each other at faces parallel to a common plane P normal to the axes of rotation of the transmission shafts to be described herein. The torque converter 18 is adapted to be drivenly connected to the output shaft of a prime mover, not shown, and the transmission 10 includes a torque converter input shaft part including a drive plate 20 for driving an impeller 22. The torque converter 18 includes a driven turbine 24 which is suitably drivably connected to a shaft 26 which in turn is drivingly connected to a gear 28. The gear 28 is meshed with an idler gear 30 rotatably mounted on a stub shaft 32 supported in the housing section 14.

The gear 30 is in constant mesh with a gear 34 and a gear 36 which are mounted on respective clutch shafts 38 and 40 rotatably disposed in the transmission housing 11. In the view of FIG. 1, the gear 36 is not shown meshed with the gear 30 due to the developed plane of the drawing figure; however, these gears are indicated by the dashed lines in FIG. 2 as being in constant mesh with each other. The shaft 38 is mounted in the housing 11 on spaced apart bearings 42 and 44 and the shaft 40 is also mounted in the housing on spaced apart bearings 46 and 48. The bearings 44 and 48 are conveniently mounted on a support web 15 which is preferably formed as part of the housing section 14.

The shaft 38 supports a hydraulically actuated multiplate clutch comprising a forward directional drive clutch, generally designated by the numeral 50. The clutch 50 is generally typical of a type of clutch used in conventional powershift gear transmissions and includes a clutch drum 52 supported on and keyed for rotation with the shaft 38, and a hub 54 connected to the gear 34. A plurality of interleaved discs or plates 56, 58 are connected, respectively, to the drum 52 and to the hub 54 and are operable to be forced into driving engagement with each other in response to pressure fluid acting on a piston 60.

The clutch 50 is generally of a type known in the art of powershift transmissions and is not believed to require further detailed description to enable one skilled in the art to practice the present invention. A more detailed description of the general type of clutch discussed herein may be obtained by reference to U.S. Pat. No. 3,913,411 to James J. Jameson and assigned to the assigned to the assignee of the present invention. Certain other conventional elements used in the transmission 10 such as ball or roller type bearings for supporting the respective gears and shafts are also not believed to require detailed description and are readily understandable from viewing the drawing figures. With respect to the operation of the clutch 50, in response to the introduction of pressure fluid into a chamber formed between the drum 52 and the piston 60 and to act on the piston 60, the gear 34 becomes drivably engaged with the shaft 38 for rotation therewith, and in response to the relief of fluid pressure acting against the piston 60 the gear 34 may rotate relative to the shaft 38 freely on suitable support bearings.

The shaft 38 also includes clutches 62 and 64 which share a common drum 66 having a gear 68 formed on the periphery thereof. The clutch 62 includes a hub 70 secured to a gear 72 and the clutch 64 includes a hub 74 secured to a gear 76. The gear 72 is meshed with a gear 78 rotatably supported on the shaft 40 and secured for rotation with a gear 80. The gear 76 is in constant mesh with a gear 82 which is also in constant mesh with an gear 84 supported on and keyed for rotation with an output shaft 86. The output shaft 86 is mounted in the housing 11 in suitable bearings and includes opposed output coupling portions 88 and 90 of a conventional type for connection to respective propeller shafts or other power takeoff devices. The output shaft 86 also supports and is keyed for rotation with a second output gear 92 which is in constant mesh with the gear 80.

The shaft 40 supports a second directional or reverse direction clutch 94 having a drum member 96 supported on and keyed for rotation with the shaft 40 and a hub portion 98 fixed to the gear 36. A piston 100 is responsive to the transmission of pressure fluid through suitable passage means in the shaft 40 to effect engagement of the clutch 94 whereby the gear 36 is drivingly connected to the shaft 40.

The shaft 40 also supports and is in driving engagement with a double clutch drum 104 of respective clutches 106 and 108. The clutch drum 104 includes a gear 110 which is in constant mesh with the gear 68. The clutch 106 includes a hub 112 which is fixed for rotation with the gear 78 and the clutch 108 includes a hub 114 which is fixed for constant rotation with the gear 82.

The overall arrangement of gears and clutches described hereinabove provides a compact arrangement and a minimal number of gears and clutches for a transmission requiring four speeds forward and four speeds in reverse as regards the rotation and speed of the output shaft 86 with respect to the input shaft 26. Other advantageous aspects of the configuration of the transmission 10 include an arrangement wherein the shafts 38 and 40 include respective distal end portions 39 and 41 which project from the housing section 12 and into respective bores 120 and 121 formed in a control valve housing, generally designated by the numeral 122. The housing 122 includes suitable passages, not shown in FIG. 1, which are formed therein and adapted to be in registration with respective spaced apart annular grooves formed in the shaft distal end portions 39 and 41, which grooves are in communication with respective passages extending through the shafts for conducting pressure fluid to actuate the clutches 50, 62, 64, 94, 106, and 108, respectively. By arranging the clutch control passages to extend to the shaft distal ends 39 and 41 of the respective shafts 38 and 40 and by utilizing the shaft distal ends to pilot or locate the control valve housing 122, the valve housing may be easily mounted on and removed from the transmission housing section 12 for access to the shaft ends to change or service respective fluid seal rings which are disposed on the shaft ends and interposed between the grooves which form part of the clutch control passages.

Figure 4:
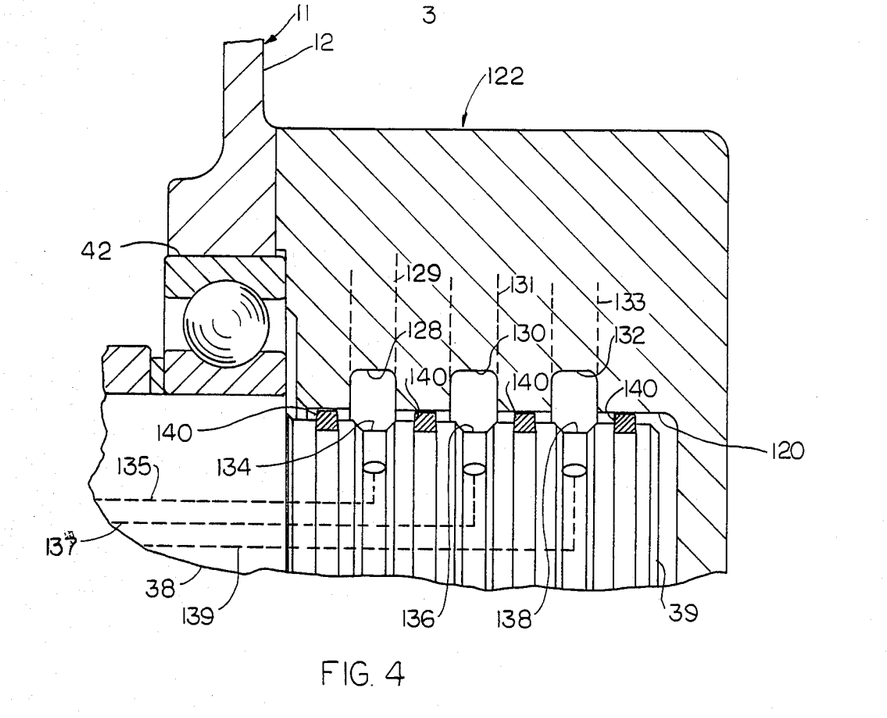
FIG. 4, is a detail view of one of the shaft ends extending into the valve housing.

Referring to FIG. 4, by way of example, a portion of the shaft end 39 is illustrated together with a portion of the control valve housing 122 including the bore 120. The housing 122 includes spaced apart annular grooves 128, 130 and 132, which are respectively in registration with suitable fluid passages 129, 131 and 133 for conducting pressure fluid signals to the respective clutches 50, 62 and 64. The shaft end 39 includes respective annular grooves 134, 136 and 138 which are in constant communication with the grooves 128, 130 and 132, are separated from each other by metallic or non metallic ring type seals 140 which are disposed in respective annular grooves formed in the shaft end and are in sealing engagement with the housing wall defining the bore 120. The grooves 134, 136 and 138 communicate with respective passages 135, 137 and 139 which lead to the clutches 50, 62 and 64. The close proximity of the valve housing 122 to the respective clutches associated with the shafts 38 and 40 improves clutch engagement and disengagement response time. Still further, pressure fluid may be introduced into further passages, not shown, in the shafts 38 and 40 from the valve housing 122 to provide lubrication and cooling of the clutches and bearings associated with the respective shafts. Again, the relatively close proximity of the flow passages in the housing 122 to the respective shafts minimizes flow and power losses associated therewith.

The arrangement of the respective directional clutches 50 and 94 on the opposite ends of the shafts 38 and 40 is also advantageous in that these clutches are readily accessible for servicing and repair. Thanks to the provision of the bearing support web 15 in the housing section 14 for supporting the shaft bearings 44 and 48, both of the clutches 50 and 94 may be inspected and disassembled by the removal of a one piece cover 140, FIG. 1, which is secured to the housing section 14 by suitable threaded fasteners 142. By removing the cover 140 and suitable retaining rings 143, disposed on the shafts 38 and 40, the clutch drums 52 and 96 may be removed directly from the ends of the shafts for servicing of the clutch plates or the respective pistons 60 and 100.

Figure 3:
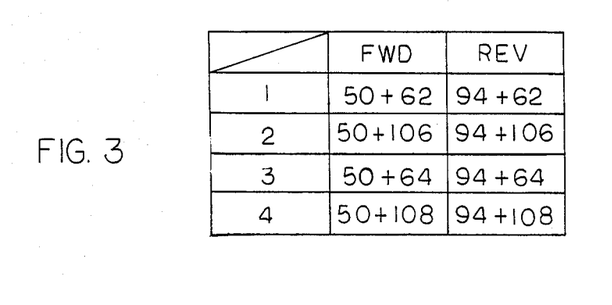
FIG. 3 is chart showing the schedule of clutches engaged for the various speed ranges in both forward and reverse.

The operation of the transmission 10 to provide four speeds in both forward and reverse direction of rotation of the output shaft 86 will not be described in conjunction with FIGS. 1 and the clutch engagement schedule of FIG. 3. The speed ranges will be referred to in the sense of a first speed, second speed and so on wherein the first speed provides the lowest rotational speed of the shaft 86 with respect to the shaft 26. In socalled first speed in the forward direction the clutch 50 is engaged and the clutch 94 is disengaged whereby the shaft 38 is rotatably driven from the shaft 26 through gears 28, 30 and 34. Clutch 62 is engaged whereby the output shaft 86 is driven by the shaft 38 through gears 72, 78, 80 and 92.

In driving the shaft 86 in a forward second speed the clutch 50 remains engaged and the clutch 106 is also engaged whereby the shaft 38 drives the shaft 86 through the gears 68, 110, 80 and 92.

The output shaft 86 is driven in forward third speed with the clutches 50 and 64 engaged whereby the shaft 38 drives the shaft 86 directly through gears 76, 82 and 84.

Finally, the transmission 10 is operated in forward fourth speed with the clutches 50 and 108 engaged whereby the shaft 38 drives the shaft 40 through gears 68 and 110 and the shaft 40 is drivingly interconnected with the shaft 86 by way of gears 82 and 84.

In the reverse mode of operation, in all four speeds the clutch 94 is engaged and the clutch 50 is disengaged whereby the shaft 40 is drivenly connected to the shaft 26 by way of gears 28, 30 and 36. In the first or low speed in reverse rotational direction clutches 94 and 62 are engaged whereby shaft 38 is driven by shaft 40 through gears 110 and 68 and shaft 86 is driven by gears 72, 78, 80 and 92. In reverse second gear clutches 94 and 106 are engaged whereby the shaft is driven by shaft 40 through gears 78, 80 and 92.

Third speed in reverse is accomplished by engagement of clutches 94 and 64 whereby shaft 86 is driven by shaft 40 via shaft 38 and through gears 110, 68, 76, 82 and 84.

Finally, fourth speed in reverse is accomplished by the engagement of clutches 94 and 108 wherein the shaft 86 is driven by shaft 40 through gears 82 and 84.

Figure 2:
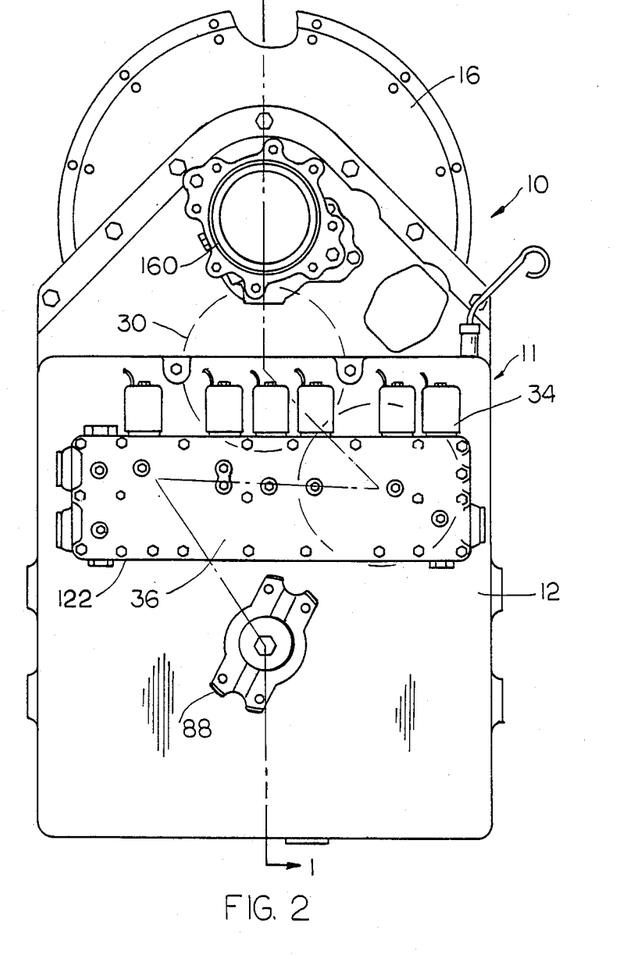
FIG. 2 is an end view of the transmission housing showing the location of the control valve housing.

The transmission 10 further advantageously includes a lubricating pump arrangement comprising a shaft driven positive displacement pump 160, FIGS. 1 and 2, which is mounted on the housing section 12 and includes a shaft 161 drivenly connected to the power input shaft 20 by suitable means including a coupling 162 supported in the housing section for rotation on suitable bearings, as illustrated. The pump 160 is thus driven at the speed of the input shaft or drive plate 20 for supplying lubricating, cooling and clutch actuating fluid to the transmission 10 regardless of the speed of the turbine 24 and the shaft 26 with respect to the drive plate.

Those skilled in the art will appreciate from the foregoing description of the operation of the transmission 10 that a particularly compact and uncomplicated arrangement of six clutches on two parallel clutch shafts provides for driving the output shaft 86 in four speeds forward and four reverse in a compact clutch and gearing arrangement which provides an unobvious improvement in the art of powershift type transmissions. The general operation of the transmission is believed to be understandable to one of skill in the art from the foregoing description. Conventional engineering materials are utilized in the construction of the transmission and conventional machine elements such as ball and roller type bearings are illustrated in the drawing figures in supportive relationship to respective ones of the gears which are supported on the clutch shafts 38 and 40. These elements have not been described in detail as their function is believed to be readily understandable from the drawing figures.

Those skilled in the art will recognize that various substitutions and modifications may be made to the specific embodiment described herein without departing from the scope and spirit of the invention as recited in the appended claims.

What is claimed is:

1. A multi-speed powershift geared transmission, comprising:

an input shaft having an input gear means;

an output shaft having a first and second output gear mounted thereon;

a housing having opposed bearings mounted thereon for rotatably supporting said input and output shafts and first and second opposed end walls;

a first and a second parallel clutch shaft rotatably supported by bearings in aligned bores in said opposed walls;

a forward gear rotatably mounted on said first clutch shaft;

a forward directional clutch mounted on said first clutch shaft for selectively engaging said forward gear to rotate said first clutch shaft;

a reverse gear rotatably mounted on said second clutch shaft;

a reverse directional clutch mounted on said second clutch shaft for selectively engaging said reverse gear to rotate said second clutch shaft;

said forward and reverse gear in constant mesh with said input gear means;

a first/third clutch hub mounted on said first clutch shaft between said forward directional clutch and said second wall;

a second/fourth clutch hub mounted on said second clutch shaft between said reverse directional clutch and said second wall;

a first/third clutch hub gear mounted on said first/third clutch hub;

a second/fourth clutch hub gear mounted on said second/fourth clutch hub;

said first/third clutch hub gear meshing with said second/fourth clutch hub gear;

a first drive gear rotatably mounted on said first clutch shaft between said second wall and said first/third clutch hub;

a first speed ratio clutch disposed within said first/third clutch hub for selectively engaging said first drive gear;

a third drive gear rotatably mounted on said first clutch shaft between said forward directional clutch and said first/third clutch hub;

a third speed ratio clutch disposed with said first/third clutch hub for selectively engaging said third drive gear;

a second drive gear rotatably mounted on said second clutch shaft between said second wall and said second/fourth clutch hub and meshed with said first drive gear;

a second speed ratio clutch disposed within said second/fourth clutch hub for selectively engaging said second drive gear;

a fourth drive gear rotatably mounted on said second clutch shaft between said reverse directional clutch and said second/fourth clutch hub and meshed with said third drive gear;

a fourth speed ratio clutch disposed within said second/fourth clutch hub for selectively engaging said fourth drive gear;

control valve means disposed adjacent the ends of said first and second clutch shafts exteriorly of said second end wall for selectively hydraulically engaging said directional clutches and said speed ratio clutches;

hydraulic fluid pumping means disposed on said transmission housing for supplying said control valve means with hydraulic fluid under pressure;

fluid conduit means for providing fluid communication between said hydraulic fluid pumping means and said control valve means; and hydraulic engagement means associated with said directional clutches and said speed ratio clutches for selecting the output shaft speed and direction in response to hydraulic actuation by said control valve means.

2. A multi-speed powershift geared transmission, comprising:

an input means and an output means and drive gearing means for driving said output means at selected speeds and directions with respect to said input means;

a housing having opposed bearings mounted thereon for rotatably supporting said input and output shafts and first and second opposed end walls;

a support web disposed within said housing between said first and second opposed end walls;

said input means having an input gear thereon;

said output means having an output gear thereon;

said drive gearing means having a first and a second parallel clutch shaft rotatably supported by bearings in aligned bores in said web support and second opposed end wall, pressure responsive directional and range clutches mounted thereon, and meshing means for meshing with said input gear and output gear;

a control valve housing located on said second opposed end wall exterior said housing adjacent said aligned bores therein;

a first clutch shaft valve bore located in said control valve housing receiving said first clutch shaft therein;

a second clutch shaft valve bore located in said control valve housing receiving said second clutch shaft therein;

said first clutch shaft bore having first annular grooves therein in communication with first valve means in said control valve housing;

said second clutch shaft bore having second annular grooves therein in communication with second valve means disposed within said control valve housing;

said first clutch shaft having first clutch shaft passages therein in fluid communication with said clutches on said first clutch shaft, said passages terminating on the outer diameter of said first clutch shaft in fluid communication with said first annular grooves in said first clutch shaft bore, wherein each of said first clutch shaft passages align with one of said first annular grooves;

said second clutch shaft having second clutch shaft passages therein in fluid communication with said clutches on said second clutch shaft, said second passages terminating on the outer diameter of said second clutch shaft in fluid communication with said second annular grooves in said second clutch shaft bore, wherein each of said second passages align with one of said second annular grooves;

wherein, selective application of hydraulic fluid under pressure from said first valve means and said second valve means through said first annular grooves and second annular grooves and said first annular grooves and second annular grooves and said first and second passages selectively actuates said clutches to engage said output means to rotate at selected speeds in forward or reverse direction with respect to said input means.

3. A multi-speed powershift geared transmission for selectively engaging an output shaft to adjust the speed and direction of the output shaft with respect to an input shaft, comprising:

a transmission housing having exterior walls with opposed bearings for supporting the input shaft and output shaft;

a web support disposed on said transmission housing, said transmission housing having an opposed exterior wall opposite said web support;

first and second parallel clutch shafts rotatably supported by bearings in aligned bores in said web support and said opposed exterior wall;

a first and a third speed ratio clutch mounted within a first geared housing on said first clutch shaft;

a second and a fourth speed ratio clutch mounted within a second geared housing on said second clutch shaft, said first and second geared housings disposed within said transmission housing between said web support and opposed exterior wall and having gears thereon in constant mesh;

a forward directional clutch mounted exteriorly of said web support on one end of said first clutch shaft cantilevered from said web support;

a reverse directional clutch mounted exteriorly of said web support on one end of said second clutch shaft cantilevered from said web support;

a forward gear rotatably mounted on said first clutch shaft for selectively drivingly engaging said forward directional clutch to drive said first clutch shaft;

a reverse gear rotatably mounted on said second clutch shaft for selectively drivingly engaging said reverse directional clutch to drive said second clutch shaft, said forward and reverse gears meshing with an input gear rotatably connected to the input shaft;

range gear means associated with each of said speed ratio clutches for selectively engaging one of said speed ratio clutches to drivingly engage one of two output shaft gears to drive the output shaft in a forward or reverse rotational direction with respect to the input shaft at a selected one of four speeds;

a cover removably attached to the exterior of said transmission housing opposite said web support adjacent said directional clutches for enclosing said directional clutches without engaging said clutch shafts whereby said directional clutches may be removed from said clutch shafts without removing said gears and bearings and may be replaced on said housing without piloting said clutch shafts into bearing bores.

4. A multi-speed powershift geared transmission, comprising:

an input shaft having an input gear means and;

an output shaft having a first and second output gear mounted thereon;

a housing having opposed bearings mounted thereon for rotatably supporting said input and output shafts and first and second opposed end walls;

a support web disposed within said housing between said first and second opposed end walls;

first and second parallel clutch shaft rotatably supported by bearings in aligned bores in said support web and second opposed end wall;

a forward gear rotatably mounted on said first clutch shaft between said first end wall and said support web;

a forward directional clutch mounted on said first clutch shaft between said first end wall and said forward gear for selectively engaging said forward gear to rotate said first clutch shaft;

a reverse gear rotatably mounted on said second clutch shaft between said first end wall and said web support;

a reverse directional clutch mounted on said second clutch shaft between said first end wall and said reverse gear for selectively engaging said reverse gear to rotate said second clutch shaft;

said forward and reverse gears in constant mesh with said input gear means;

a first and third speed ratio clutch mounted within a first geared housing on said first clutch shaft; a second and fourth speed ratio clutch mounted within a second geared housing on said second clutch shaft, said first and second geared housings disposed within said transmission housing between said web support and opposed exterior wall and having gears thereon in constant mesh;

range gear means associated with each of said speed ratio clutches for selectively engaging one of said speed ratio clutches to drivingly engage one of two output shaft gears to drive the output shaft in a forward or reverse rotational direction with respect to the input shaft at a selected one of four speeds;

a control valve housing located on said second opposed end wall exterior said housing adjacent said aligned bores therein;

a first clutch shaft valve bore located in said control valve housing receiving said first clutch shaft therein;

a second clutch shaft valve bore located in said control valve housing receiving said second clutch shaft therein;

said first clutch shaft bore having annular grooves therein in communication with valve means in said control valve housing;

said second clutch shaft bore having annular grooves therein in communication with valve means in said control valve housing;

said first clutch shaft further having a forward clutch passage therein in communication with said forward clutch, a first clutch passage therein in communication with said first clutch and a third clutch passage therein in communication with said third clutch, said passages terminating on the outer diameter of said first clutch shaft in registration with said annular grooves in said first clutch shaft bore, wherein each of said passages align with one of said annular grooves;

said second clutch shaft further having a reverse clutch passage therein in communication with said forward clutch, second clutch passage therein in communication with said second clutch and a fourth clutch passage therein in communication with said fourth clutch, said passages terminating on the outer diameter of said second clutch shaft in registration with said annular grooves in said second clutch shaft bore, wherein each of said passages align with one of said annular grooves;

wherein, selective application of hydraulic fluid under pressure from said valve means through said annular grooves and said passages selectively actuates said clutches to engage said output shaft to rotate at selected speeds in forward or reverse direction with respect to said input shaft.

5. A multi-speed powershift geared transmission for selectively engaging an output shaft to adjust the speed and direction of the output shaft with respect to an input shaft, comprising:

a transmission housing having exterior walls with opposed bearings for supporting the input shaft and output shaft;

a web support disposed on said transmission housing, said transmission housing having an opposed exterior wall opposite said web support;

first and second parallel clutch shafts rotatably supported by bearings in aligned bores in said web support and said opposed exterior wall;

first and third speed ratio clutches mounted within a first geared housing on said first clutch shaft;

second and fourth speed ratio clutches mounted within a second geared housing on said second clutch shaft, said first and second geared housings disposed within said transmission housing between said web support and opposed exterior wall and having gears thereon in constant mesh;

a forward directional clutch mounted exteriorly of said web support on one end of said first clutch shaft cantilevered from said web support;

a reverse directional clutch mounted exteriorly of said web support on one end of said second clutch shaft cantilevered from said web support;

a forward gear rotatably mounted on said first clutch shaft for selectively drivingly engaging said forward directional clutch;

a reverse gear rotatably mounted on said second clutch shaft for selectively drivingly engaging said reverse directional clutch, said forward and reverse gears meshing with an input gear rotatably connected to the input shaft;

range gear means associated with each of said speed ratio clutches for selectively engaging one of said speed ratio clutches to drivingly engage one of two output shaft gears to drive the output shaft in a forward or reverse rotational direction with respect to the input shaft at a selected one of four speeds;

control valve means disposed adjacent the other ends of said first and second clutch shafts exteriorly of said opposed exterior wall for selectively hydraulically engaging said directional clutches to drive said clutch shafts and said speed ratio clutches;

hydraulic fluid pumping means disposed on said transmission housing for supplying said control valve means with hydraulic fluid under pressure;

fluid conduit means for providing fluid communication between said hydraulic fluid pumping means and said control valve means;

hydraulic engagement means associated with said directional clutches and said speed ratio clutches for selecting the output shaft speed and direction;

fluid passage means through said first and second clutch shafts for providing fluid communication between said control valve means and said hydraulic engagement means whereby fluid flows to said clutches from said control valve means through said clutch shafts; and a cover removably attached to the exterior of said transmission housing for enclosing said directional clutches without engagingly supporting said clutch shafts whereby said directional clutches may be removed from said clutch shafts without removing said gears and bearings and may be replaced on said housing without piloting said clutch shafts into bearing bores.

6. A multi-speed powershift geared transmission, comprising:

an input shaft having an input gear meshing with an idler gear mounted on an idler shaft;

an output shaft having a first and second output gear mounted thereon;

a housing having opposed bearings mounted thereon for rotatably supporting said input and output shafts and having first and second opposed end walls;

a support web disposed within said housing between said first and second opposed end walls;

first and second parallel clutch shafts rotatably supported by bearings in aligned bores in said web support and second opposed end wall;

a forward gear rotatably mounted on said first clutch shaft between said first end wall and said web support;

a forward directional clutch mounted on said first clutch shaft between said first end wall and said forward gear for selectively engaging said forward gear to rotate said first clutch shaft;

a reverse gear rotatably mounted on said second clutch shaft between said first end wall and said web support;

a reverse directional clutch mounted on said second clutch shaft between said first end wall and said reverse gear for selectively engaging said reverse gear to rotate said second clutch shaft;

said forward and reverse gears in constant mesh with said idler gear;

an access aperture disposed in said first end wall adjacent said directional clutches having a removable cover thereon, said cover spaced apart and not in contact with said directional clutches;

a first/third clutch hub mounted on said first clutch shaft between said web support and said second end wall;

a second/fourth clutch hub mounted on said second clutch shaft between said web support and said second end wall;

a first/third clutch hub gear mounted on said first/third clutch hub;

a second/fourth clutch hub gear mounted on said second/fourth clutch hub;

said first/third clutch hub gear meshing with said second/fourth clutch hub ring gear;

a first drive gear rotatably mounted on said first clutch shaft between said second end wall and said first/third clutch hub;

a first speed ratio clutch disposed within said first/third clutch hub for selectively engaging said first drive gear;

a third drive gear rotatably mounted on said first clutch shaft between said web support and said first/third clutch hub;

a third speed ratio clutch disposed within said first/third clutch hub for selectively engaging said third drive gear;

a second drive gear rotatably mounted on said second clutch shaft between said second end wall and said second/fourth clutch hub and meshed with said first drive gear;

a second speed ratio clutch disposed within said second/fourth clutch hub for selectively engaging said second drive gear;

a fourth drive gear rotatably mounted on said second clutch shaft between said web support and said second/fourth clutch hub and meshed with said third drive gear;

a fourth speed ratio clutch disposed within said second/fourth clutch hub for selectively engaging said fourth drive gear;

said first output gear meshing with said fourth drive gear and said second output gear meshing with said second drive gear;

a control valve housing located on said second opposed end wall exterior said housing adjacent said aligned bores;

a first clutch shaft valve bore located in said control valve housing receiving said first clutch shaft therein;

a second clutch shaft valve bore located in said control valve housing receiving said second clutch shaft therein;

said first clutch shaft bore having first annular grooves therein in communication with first valve means disposed within said control valve housing;

said second clutch shaft bore having second annular grooves therein in communication with second valve means disposed within said control valve housing;

said first clutch shaft having a forward clutch passage therein in fluid communication with said forward clutch, a first fluid passage therein in communication with said first speed ratio clutch and a third fluid passage therein in communication with said third speed ratio clutch, said forward clutch passage and said first and third fluid passages terminating at the outer periphery of said first clutch shaft in registration with said first annular grooves in said first clutch shaft bore, wherein each of said forward clutch passage, said first fluid passage and said third fluid passages align with one of said first annular grooves;

said second clutch shaft having a reverse clutch passage therein in fluid communication with said reverse clutch, second fluid passage therein in communication with said second speed ratio clutch and a fourth fluid passage therein in communication with said fourth speed ratio clutch, said reverse clutch passage and said second and fourth fluid passages terminating at the outer periphery of said second clutch shaft in registration with said second annular grooves in said second clutch shaft bore, wherein each of said reverse clutch passage, said second fluid passage and said fourth fluid passages align with one of said second annular grooves;

wherein, selective application of hydraulic fluid under pressure from said valve means through said annular grooves and said passages selectively actuates said clutches to engage said output shaft to rotate at selected speeds in forward or reverse direction with respect to said input shaft.

* * * * *